No. 799,467. PATENTED SEPT. 12, 1905.
T. H. JONES.
SEED PLANTER.
APPLICATION FILED JULY 1, 1905.

2 SHEETS—SHEET 1.

Witnesses:
C. D. Kesler
William F. Jones,

Inventor
Thomas H. Jones
By James W. Norris.
Atty.

No. 799,467. PATENTED SEPT. 12, 1905.
T. H. JONES.
SEED PLANTER.
APPLICATION FILED JULY 1, 1905.

2 SHEETS—SHEET 2.

Witnesses:
C. D. Kesler
William J. Jones.

Inventor
Thomas H. Jones
By James L. Norris
Atty.

UNITED STATES PATENT OFFICE.

THOMAS H. JONES, OF McLENDON, ALABAMA.

SEED-PLANTER.

No. 799,467.     Specification of Letters Patent.     Patented Sept. 12, 1905.

Application filed July 1, 1905. Serial No. 267,924.

*To all whom it may concern:*

Be it known that I, THOMAS H. JONES, a citizen of the United States, residing at McLendon, in the county of Russell and State of Alabama, have invented new and useful Improvements in Seed-Planters, of which the following is a specification.

This invention relates to seed-planters particularly adapted for depositing cotton-seed or corn in the ground at regular intervals and of that type embodying a seed-receiving hopper having a slotted base-support or bottom with a slide movable over the under side and controlling the outlet of the seed from the hopper.

The improved planter is composed of simplified elements of a strong and durable nature having a positive operation to effectively drop or deposit the seed in the ground and capable of variation as to the distance apart of the seed-hills by a simple interchanging of gearing actuated by a single ground-wheel, the gearing coöperating with an agitator-shaft in a seed-containing hopper and the shaft provided with the particular mechanism for regularly moving a slide in opposite lateral directions to control the outlet of the seed from the hopper.

The invention also consists in the details of construction and arrangement of parts, which will be more fully hereinafter specified.

Figure 1:
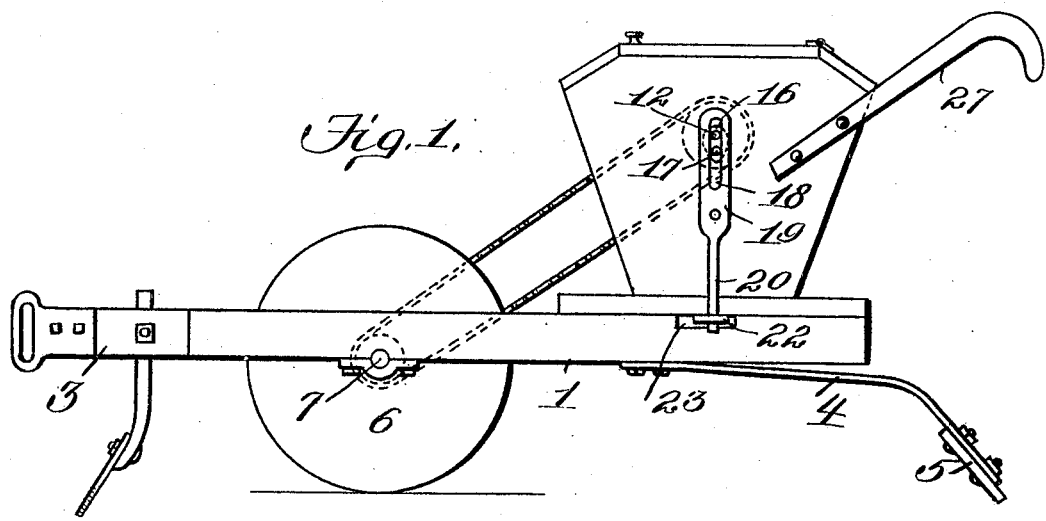
Figure 2:
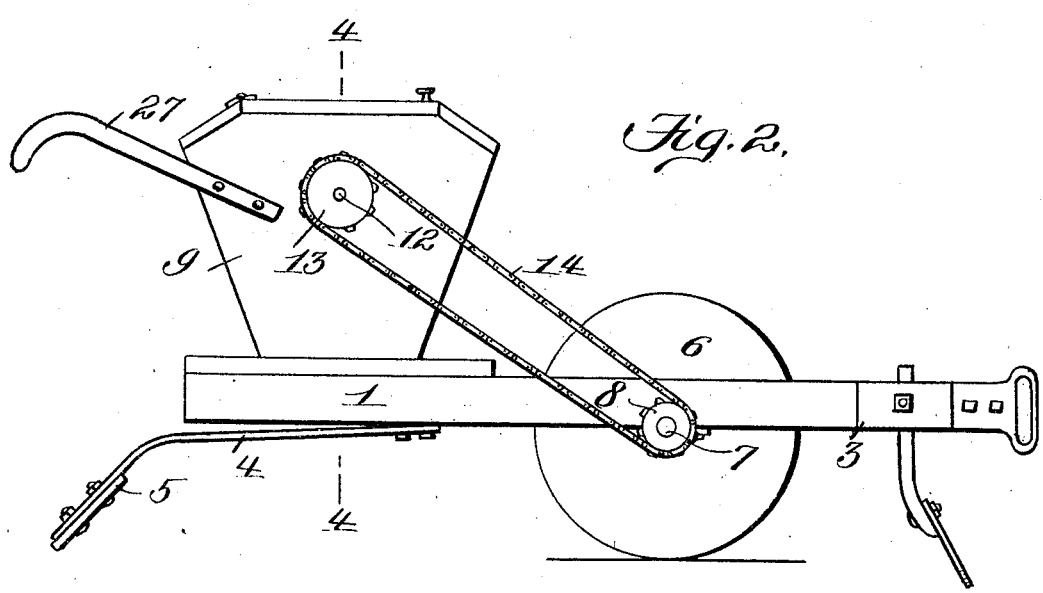
Figure 3:
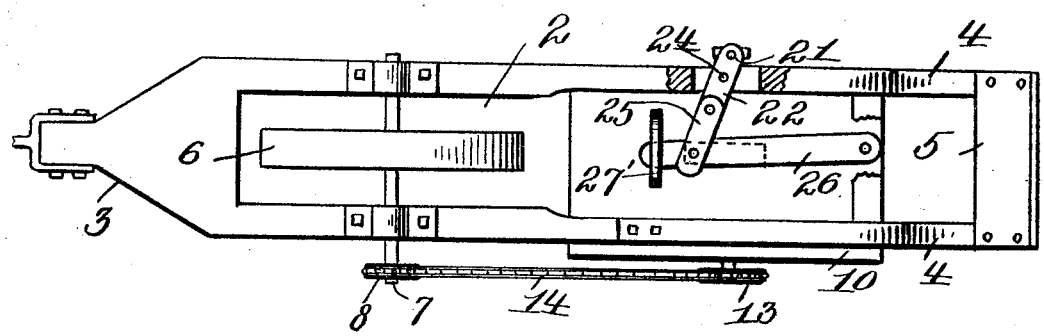
Figure 4:
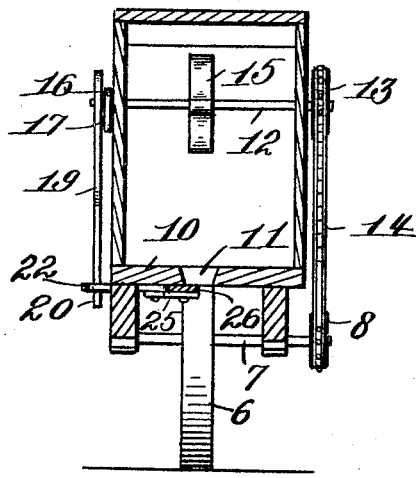

In the drawings, Figure 1 is a side elevation of a seed-planter embodying the features of the invention. Fig. 2 is a similar view looking toward the opposite side of the planter. Fig. 3 is a bottom plan of the planter, partly in section. Fig. 4 is a transverse vertical section on the line 4 4, Fig. 2.

Similar numerals of reference indicate corresponding parts throughout the several views.

The numeral 1 designates a supporting-frame, which may be of any preferred construction and provided with a central opening 2, extending longitudinally thereof, and also with means at the forward reduced extremity 3 for receiving a suitable clevis or other device for attaching the draft appliances. To the bottom of the rear extremity of the frame 1 on opposite sides of the opening 2 rearwardly-projecting yielding arms 4 are secured and have their rear terminals bent downwardly and attached to a coverer 5. In the forward portion of the opening 2 a ground-wheel 6 is arranged and held on a shaft 7, mounted in suitable bearings and projected at one side to receive a sprocket-gear 8. The ground-wheel 6 may be provided with any suitable peripheral devices—such as pins, teeth, or lugs—to render the engagement thereof with the ground-surface effective in rotating or actuating the mechanism connected thereto, said ground-wheel forming the prime operating means for the movable elements, which will be more fully hereinafter specified.

A seed-hopper 9 is disposed on the rear extremity of the frame 1 and has an extended bottom 10 with a centrally-disposed longitudinally-extending outlet-slot 11 therein. The hopper 9 will also be provided with a suitable cover or lid to shield the seed placed therein. Transversely extending through the hopper 9 is a shaft 12, projected at its opposite ends through the sides of the hopper and having fixed on one end a sprocket-gear 13, and over the sprocket-wheels 8 and 13 a suitable chain belt 14 is trained to transmit motion from the shaft 7 to the shaft 12. The gears 8 and 13 are interchangeable to vary the distance apart of the seed-hills or the dropping operation of the machine, and to still further modify the operation of the machine in this particular other gears varying in dimensions may be substituted for those shown. The shaft 12 has at the center an agitator 15, which insures a regular feed of the seed in the hopper downwardly through the slot 11, the latter having its upper portion beveled inwardly, as shown by Fig. 4, for obvious reasons.

On the end of the shaft 12 opposite that carrying the sprocket-gear 13 is a crank-arm 16, having a crank-pin 17 projecting outwardly therefrom and through an upper elongated slot 18 of an oscillating lever 19, fulcrumed on the same side of the hopper at a suitable point below the position of the shaft 12. The lower extremity 20 of the lever 19 is reduced and tapered to a point and loosely projects through an opening 21 in the outer extremity of a flat slide-arm 22, which extends through a slot 23 in the adjacent side of the frame 1. The arm 22 is held in the slot 23 by an intermediate pivot 24, and to its inner extremity is movably attached a flat link 25, also pivotally secured to the forward end of a laterally-reciprocating slide 26, the latter being pivotally connected at its rear end against the under side of the bottom 10 and so positioned with respect to the slot 11 as to alternately open and close the latter during the operation of the mechanism. To prevent straining and also to serve as a support for the slide, the free end thereof loosely plays in a transversely-extending guide-strap 27', secured to the bottom 10.

The interposition of the flat link 25 between the arm 22 and the slide 26 causes the slide to be regularly shifted in opposite lateral directions when the arm is actuated, and by this means also a greater range of movement is imparted to the slide. The lower reduced or tapered end 20 of the lever 19 is advantageous in the assemblage of the said lever with respect to the arm 22 and also prevents jamming of these coöperating parts in view of the fact that the reduced end 20 will move through the opening in the outer end of the arm 22, the extent of movement of the said reduced end in the arm being governed by the forward or rearward distance of the said arm with respect to a vertical line drawn through the fulcrum of the oscillating lever.

From the foregoing description the operation of the planter will be readily apparent. Cotton or other seed is placed in the hopper 9, and as the planter is moved over the ground-surface the gears 8 and 13 are set in motion and the shaft 12 actuated. The agitator 15 will cause the seed to be regularly fed toward the opening 11 in the bottom 10, and the slide 26 will be regularly opened and closed through the operation of the oscillating lever 19 engaging the arm 22. After the seed is dropped the coverer 5 will draw the soil thereover, and by this means planting operations can be effectively and expeditiously carried on.

The improved planter structure is generally light and the machine may be readily handled, suitable guiding means being used therewith, such as handle-bars 27, secured to opposite sides of the hopper or to the frame, as may be desired.

The simplicity of structure of the planter materially decreases its cost of manufacture.

Though the machine has been particularly described for use as a seed-planter, it will be understood that it might be equally well used as a distributer for fertilizers.

Having thus described the invention, what is claimed as new is—

1. In a planter of the class set forth, the combination of a supporting means, a hopper on the rear extremity of said means having a bottom with a longitudinally-disposed slot therein, a laterally-reciprocating slide applied against the bottom and pivotally attached at its rear extremity, a pivoted arm movably connected to the forward extremity of the slide and projecting outwardly through one side of the supporting means, an oscillating lever having a lower reduced extremity loosely engaging the outer end of the said arm, and mechanism for operating said lever.

2. In a planter of the class set forth, the combination of supporting means, a hopper disposed on the supporting means and having a bottom with an opening therein, a slide applied to the under side of the hopper-bottom and reciprocable transversely across the opening, an arm connected to the slide and projecting outwardly through one side of the supporting means, the arm having a pivotal movement in a plane at right angles to that of the slide, an oscillating lever loosely engaging the outer end of the arm, and mechanism for operating the lever.

3. In a planter of the class described, the combination of supporting means, a hopper disposed on the rear extremity of the supporting means and having a bottom with an opening therein, a shaft extending through the hopper and having a crank-arm on one end provided with a projection, a lateral reciprocating slide applied against the under side of the bottom of the hopper, a lateral projecting arm movably attached to the forward extremity of the slide, an oscillating lever having a lower reduced end loosely engaging the outer extremity of the arm and also provided with a slot in its upper extremity through which the projection of the crank-arm loosely extends, and mechanism for operating the said shaft.

4. In a cotton-planter of the class described, the combination of the supporting means, a hopper disposed on the rear of said supporting means and having a bottom therein, a laterally-reciprocating slide mounted against the under side of the hopper-bottom to control the opening in the latter, a transversely-extending pivoted arm movably connected to the forward extremity of the slide, an oscillating lever having its lower extremity loosely engaging the outer end of the arm, mechanism for operating the said lever, and a rear coverer.

5. In a seed-planter of the class set forth, the combination of a supporting means, a hopper disposed thereon and having a bottom with an opening therein, a laterally-reciprocating slide pivoted at its rear extremity against the under side of the hopper-bottom to control the opening in the latter, a transversely-extending pivoted arm movably connected to said slide, means loosely engaging the outer extremity of the arm for actuating the latter and the slide, and mechanism for operating the said means.

6. In a seed-planter of the class set forth, the combination of supporting means, a hopper disposed on the supporting means and having a bottom with an opening therein, a laterally-reciprocating slide applied against the under side of the hopper-bottom and secured at its rear extremity, a link attached to the front extremity of the slide, a transversely-extending pivoted arm movably connected to the link, a vertically-disposed oscillating lever having its lower end loosely engaging the outer end of the arm, a shaft having means loosely projecting through the upper extremity of the lever, and means for operating the said shaft.

In testimony whereof I have hereunto set my hand in presence of two subscribing witnesses.

THOMAS H. JONES.

Witnesses:
C. W. CARINGTON,
J. S. OWENS.